(12) United States Patent
Fujimoto et al.

(10) Patent No.: US 8,779,087 B2
(45) Date of Patent: Jul. 15, 2014

(54) METHOD FOR PRODUCING ALIPHATIC POLYCARBONATE

(75) Inventors: Nobutaka Fujimoto, Hyogo (JP); Masafumi Okamoto, Hyogo (JP)

(73) Assignee: Sumitomo Seika Chemicals Co., Ltd., Hyogo (JP)

( * ) Notice: Subject to any disclaimer, the term of this patent is extended or adjusted under 35 U.S.C. 154(b) by 335 days.

(21) Appl. No.: 13/321,118

(22) PCT Filed: May 6, 2010

(86) PCT No.: PCT/JP2010/057749
§ 371 (c)(1),
(2), (4) Date: Jan. 17, 2012

(87) PCT Pub. No.: WO2010/134425
PCT Pub. Date: Nov. 25, 2010

(65) Prior Publication Data
US 2012/0123066 A1    May 17, 2012

(30) Foreign Application Priority Data

May 22, 2009 (JP) ................... 2009-124391

(51) Int. Cl.
*C08G 64/32* (2006.01)
*C08G 64/02* (2006.01)
*C08G 64/34* (2006.01)
*C08G 64/42* (2006.01)
*C08G 59/68* (2006.01)
*C08G 65/04* (2006.01)

(52) U.S. Cl.
CPC ............... *C08G 64/34* (2013.01); *C08G 64/42* (2013.01)
USPC ........... 528/414; 528/297; 528/408; 528/482; 528/486; 528/487; 502/150; 502/152; 502/164

(58) Field of Classification Search
CPC ..................................................... C08G 64/32
USPC ......... 528/414, 297, 405, 408, 482, 486, 487; 502/150, 152, 164
See application file for complete search history.

(56) References Cited

U.S. PATENT DOCUMENTS

| 4,960,862 A | 10/1990 | Carroll et al. |
| 4,981,948 A | 1/1991 | Kawachi et al. |
| 2006/0074218 A1 | 4/2006 | Moon et al. |

FOREIGN PATENT DOCUMENTS

| EP | 2 017 297 | 1/2009 |
| JP | 52-151116 | 12/1977 |
| JP | 2-047134 | 2/1990 |
| JP | 2005-530021 | 10/2005 |
| JP | 2007-302731 | 11/2007 |
| WO | 2004/000911 | 12/2003 |
| WO | 2010/033705 | 3/2010 |

OTHER PUBLICATIONS

Inoue, et al., "Poly(Propylene Carbonate) from Carbon Dioxide and Propylene Oxide", Macromolecular Syntheses vol. 7, pp. 87-89, 1969.
Sugimoto, et al., "Alternating Copolymerization of Carbon Dioxide and Epoxide—Recent Advances", Kobunshi Ronbunshu 64(4), pp. 131-146 (2005).
Ree, et al., "Copolymerization of Carbon Dioxide and Propylene Oxide Using Various Zinc Glutarate Derivatives and Catalysts", Polymer Engineering and Science, vol. 40, issue 7, pp. 1542-1552, 2000.

*Primary Examiner* — Duc Truong
(74) *Attorney, Agent, or Firm* — Hamre, Schumann, Mueller & Larson, P.C.

(57) ABSTRACT

The present invention provides an aliphatic polycarbonate production method which, using carbon dioxide and an epoxide, easily produces aliphatic polycarbonates having a low metal catalyst content.
The invention relates to an aliphatic polycarbonate production method which includes a step of polymerization by reacting carbon dioxide with an epoxide in the presence of a metal catalyst; and a step of treating a polymer obtainable in the polymerization step with a surfactant. High-purity aliphatic polycarbonate having a low metal catalyst content can be easily provided by the aliphatic polycarbonate production method of the invention.

7 Claims, No Drawings

METHOD FOR PRODUCING ALIPHATIC POLYCARBONATE

TECHNICAL FIELD

The present invention relates to an aliphatic polycarbonate production method which, using carbon dioxide and epoxide, easily produces aliphatic polycarbonates having a low metal catalyst content.

BACKGROUND ART

Since the advent of the Industrial Revolution, mankind has consumed vast quantities of fossil fuels in creating modern society, at the same time increasing the concentration of carbon dioxide in the atmosphere. Man has also fostered a rise in carbon dioxide concentration through environmental destruction such as the destruction of forests.

Because global warming is caused by increases in greenhouse gases such as carbon dioxide, fluorocarbons and methane in the atmosphere, it is very important to reduce the atmospheric concentration of carbon dioxide, which contributes significantly to global warming. A variety of research on, for example, controlling carbon dioxide emissions and sequestering carbon dioxide is being carried out on a global scale.

Among such research, the polymerization reaction between carbon dioxide and epoxides discovered by Inoue et al. shows promise as a reaction that could help to address the problem of global warming, and is being actively investigated not only as a way of chemically fixing carbon dioxide, but also from the standpoint of utilizing carbon dioxide as a carbon resource (see Non-Patent Document 1).

Metal catalysts are generally used in polymerization reactions between carbon dioxide and epoxide. Such catalysts that have hitherto been disclosed include the product of a reaction between diethylzinc and a compound having a plurality of active hydrogens (see Non-Patent Document 2), zinc-containing solid catalysts obtained by directly contacting zinc oxide with an aliphatic dicarboxylic acid in mechanical grinding treatment means in the presence of an organic solvent (see Patent Document 1), organic salts of metals obtained by reacting a metal oxide such as zinc oxide or a metal hydroxide such as calcium hydroxide with a dicarboxylic acid such as isophthalic acid and a monocarboxylic acid such as propionic acid (see Patent Document 2), and zinc-containing solid catalysts obtained by reacting a zinc compound, an aliphatic dicarboxylic acid and a specific amount of an aliphatic monocarboxylic acid (see Patent Document 3).

However, when an aliphatic polycarbonate is produced in this way by a polymerization reaction between carbon dioxide and epoxide, residual metal catalyst remains within the resulting aliphatic polycarbonate. The stability over time or weathering resistance of secondary products produced using such a residual metal catalyst-containing aliphatic polycarbonate as the starting material may be compromised. To address this problem, methods of producing aliphatic polycarbonate which prevent beforehand the residual presence of metal catalyst have been disclosed, including, for example, a method of removing residual metal catalyst using an inorganic acid (see Non-Patent Document 3).

Patent Document 1: Japanese Kokai Publication Hei-2-47134 (JP-A Hei-2-47134)
Patent Document 2: Japanese Kokai Publication Sho-52-151116 (JP-A Sho-52-151116)
Patent Document 3: Japanese Kokai Publication 2007-302731 (JP-A 2007-302731)
Non-Patent Document 1: Macromolecular Syntheses, Vol. 7, p. 87 (1969)
Non-Patent Document 2: *Kobunshi Ronbunshu* (Collection of articles on polymer), Vol. 62, p. 131 (2005)
Non-Patent Document 3: Polymer Engineering and Science, Vol. 40, p. 1542 (2000)

SUMMARY OF THE INVENTION

Problems to be Solved by the Invention

However, with the method of removing residual metal catalyst using an inorganic acid described in Non-Patent Document 3, because purification by liquid separation is carried out using a solution of the aliphatic polycarbonate dissolved in a water-insoluble solvent and also using an aqueous solution of an inorganic acid, not only are the operations complicated, but also a large amount of wastewater is generated, leading to enormous expenses for wastewater treatment. Moreover, in terms of the production equipment as well, measures such as conversion to equipment in which inorganic acids can be used is required.

It is therefore an object of the present invention to provide an aliphatic polycarbonate production method which, using carbon dioxide and an epoxide, easily produces aliphatic polycarbonates having a low metal catalyst content.

Means for Solving the Problems

The present invention provides an aliphatic polycarbonate production method which includes a step of polymerization by reacting carbon dioxide with an epoxide in the presence of a metal catalyst; and a step of treating a polymer obtainable in the polymerization step with a surfactant.

The present invention is described below in detail.

The present inventors have discovered that by carrying out a polymerization step in which carbon dioxide is reacted with an epoxide followed by a step in which the polymer is treated with a surfactant subsequent, an aliphatic polycarbonate having a low metal catalyst content can be easily produced from carbon dioxide and an epoxide. This discovery ultimately led to the present invention.

The aliphatic polycarbonate production method of the present invention includes a polymerization step in which carbon dioxide is reacted with an epoxide in the presence of a metal catalyst.

The epoxide used in the polymerization step is not subject to any particular limitation, provided it is an epoxide which undergoes a polymerization reaction with carbon dioxide to form an aliphatic polycarbonate having a structure that includes aliphatic groups on the main chain. Illustrative examples include ethylene oxide, propylene oxide, 1-butene oxide, 2-butene oxide, isobutylene oxide, 1-pentene oxide, 2-pentene oxide, 1-hexene oxide, 1-octene oxide, 1-decene oxide, cyclopentene oxide, cyclohexene oxide, styrene oxide, vinylcyclohexene oxide, 3-phenylpropylene oxide, 3,3,3-trifluoropropylene oxide, 3-naphthylpropylene oxide, 3-phenoxypropylene oxide, 3-naphthoxypropylene oxide, butadiene monoxide, 3-vinyloxypropylene oxide and 3-trimethylsilyloxypropylene oxide. Of these epoxides, from the standpoint of having a high polymerization reactivity with carbon dioxide, preferred use can be made of ethylene oxide and propylene oxide. These epoxides may each be used singly or may be used in combinations of two or more thereof.

Examples of metal catalysts that may be used in the polymerization step include aluminum catalysts and zinc catalysts. Of these, zinc catalysts may be preferably used because they have a high polymerization activity in polymerization reactions between carbon dioxide and epoxides. Of zinc catalysts, the use of organozinc catalysts is preferred.

Illustrative examples of organozinc catalysts include zinc acetate, diethylzinc and dibutyl zinc; and organozinc catalysts obtained by reacting compounds such as primary amines, divalent phenols, divalent aromatic carboxylic acids, aromatic hydroxy acids, aliphatic dicarboxylic acids and aliphatic monocarboxylic acids with a zinc compound. Of these organozinc catalysts, organozinc catalysts obtained by reacting a zinc compound with an aliphatic dicarboxylic acid and an aliphatic monocarboxylic acid have a higher polymerization activity and are thus preferred.

In this description, organozinc catalysts obtained by reacting a zinc compound with an aliphatic dicarboxylic acid and an aliphatic monocarboxylic acid are described in greater detail as one specific form of the organozinc catalyst.

Illustrative examples of the zinc compound include inorganic zinc compounds such as zinc oxide, zinc hydroxide, zinc nitrate and zinc carbonate; and organozinc compounds such as zinc acetate, diethylzinc and dibutylzinc. Of these zinc compounds, from the standpoint of obtaining an organozinc catalyst having a high catalytic activity, preferred use can be made of zinc oxide and zinc hydroxide. These zinc compounds may each be used singly or may be used in combinations of two or more types.

Illustrative examples of the aliphatic dicarboxylic acid include malonic acid, succinic acid, glutaric acid, adipic acid and sebacic acid. Of these aliphatic dicarboxylic acids, from the standpoint of obtaining an organozinc catalyst having a high activity, preferred use can be made of glutaric acid and adipic acid. These aliphatic dicarboxylic acids may be used singly or may be used in combinations of two or more thereof.

Generally, the proportion in which the aliphatic dicarboxylic acid is used per mole of the zinc compound is preferably from 0.1 to 1.5 moles, and more preferably from 0.5 to 1.0 mole. When less than 0.1 moles of the aliphatic dicarboxylic acid is used, the reaction with the zinc compound may have difficulty proceeding. On the other hand, when more than 1.5 moles of the aliphatic dicarboxylic acid is used, in terms of the activity of the resulting organozinc catalyst, effects in accord with the amount of use may not be obtained, which may be economically undesirable.

Illustrative examples of the aliphatic monocarboxylic acid include formic acid, acetic acid and propionic acid. Of these aliphatic monocarboxylic acids, from the standpoint of obtaining an organozinc catalyst having a high activity, preferred use can be made of formic acid and acetic acid. These aliphatic monocarboxylic acids may be used singly, or may be used in combinations of two or more thereof.

The aliphatic monocarboxylic acid is used in an amount per mole of the aliphatic dicarboxylic acid of preferably from 0.0001 to 0.1 moles, and more preferably from 0.001 to 0.05 moles. When less than 0.0001 moles of the aliphatic monocarboxylic acid is used, the resulting organozinc catalyst has a structure which includes a carboxylic group at the end, and so the organozinc catalyst may have a low activity. On the other hand, when more than 0.1 moles of the aliphatic monocarboxylic acid is used, in terms of the activity of the resulting organozinc catalyst, effects in accord with the amount of use may not obtained, which may be economically undesirable.

The method of reacting the above zinc compound with an aliphatic dicarboxylic acid and an aliphatic monocarboxylic acid is not subject to any particular limitation. These may all be reacted at the same time, or first either the aliphatic dicarboxylic acid or the aliphatic monocarboxylic acid may be reacted with the zinc compound, following which the reaction product may then be reacted with the remaining reactant.

When reacting the zinc compound, the aliphatic dicarboxylic acid and the aliphatic monocarboxylic acid, a solvent may be used to smoothly carry out the reaction.

The solvent is not subject to any particular limitation, provided it is not a solvent which hinders the reaction. Illustrative examples include aromatic hydrocarbon solvents such as benzene, toluene and xylene; ether solvents such as diethyl ether, tetrahydrofuran and dioxane; carbonate solvents such as dimethyl carbonate, diethyl carbonate and propylene carbonate; and acetonitrile, dimethylformamide, dimethylsulfoxide and hexamethylphosphorous triamide. Of these solvents, the use of an aromatic hydrocarbon solvent such as benzene, toluene or xylene is preferred from the standpoint of the ease of recycled use of the solvent.

From the standpoint of smoothly carrying out the reaction, the amount of solvent used is preferably from 500 to 10,000 parts by mass per 100 parts by mass of the zinc compound.

The reaction temperature when the zinc compound, aliphatic dicarboxylic acid and aliphatic monocarboxylic acid are reacted, although not subject to any particular limitation, is preferably from 20 to 110° C., and more preferably from 50 to 100° C. The reaction time when the zinc compound, aliphatic dicarboxylic acid and aliphatic monocarboxylic acid are reacted varies depending on the reaction temperature and thus cannot be strictly specified, although in general is preferably from 1 to 20 hours.

Following completion of the reaction, the organozinc catalyst thus obtained may be used in the polymerization step in which carbon dioxide is reacted with an epoxide, either after first being isolated by a conventional technique such as filtration, or without being isolated—i.e., as present in the reaction mixture.

Concerning the use of the organozinc catalyst, when the catalyst is used in a state where it has not been isolated and remains present within the reaction mixture, it is preferable to thoroughly remove the water which may have an adverse influence on the reaction between the carbon dioxide and the epoxide.

The amount of metal catalyst which may be used in the above polymerization step is preferably from 0.001 to 20 parts by mass, and more preferably from 0.01 to 10 parts by mass, per 100 parts by mass of the epoxide. When the amount of metal catalyst used is less than 0.001 parts by mass, the polymerization reaction may have difficulty proceeding. On the other hand, when the amount of metal catalyst used exceeds 20 parts by mass, effects in accord with the amount of use may not be obtained, which may be economically undesirable.

In the above polymerization step, a reaction solvent may be used if necessary.

Various organic solvents may be used without particular limitation as the reaction solvent. Illustrative examples of such organic solvents include aliphatic hydrocarbon solvents such as pentane, hexane, octane, decane and cyclohexane; aromatic hydrocarbon solvents such as benzene, toluene and xylene; and halogenated hydrocarbon solvents such as chloromethane, methylene dichloride, chloroform, carbon tetrachloride, 1,1-dichloroethane, 1,2-dichloroethane, ethyl chloride, trichloroethane, 1-chloropropane, 2-chloropropane, 1-chlorobutane, 2-chlorobutane, 1-chloro-2-methylpropane, chlorobenzene and bromobenzene; and carbonate solvents such as dimethyl carbonate, diethyl carbonate and propylene carbonate.

From the standpoint of carrying out the reaction smoothly, the reaction solvent is preferably used in an amount of from 500 to 10,000 parts by mass per 100 parts by mass of epoxide.

In the polymerization step, the method of reacting the carbon dioxide with the epoxide in the presence of a metal catalyst is not subject to any particular limitation. For example, the method may be one in which the epoxide, the metal catalyst and, if necessary, a reaction solvent are charged into an autoclave and mixed together, following which carbon dioxide is injected under pressure, thereby effecting the reaction.

In general, the pressure under which the carbon dioxide is used in the polymerization step, although not subject to any particular limitation, is preferably from 0.1 to 20 MPa, more preferably from 0.1 to 10 MPa, and even more preferably from 0.1 to 5 MPa. When the carbon dioxide is used at a pressure in excess of 20 MPa, effects in accord with the amount of use may not be obtained, which may be economically undesirable.

The polymerization reaction temperature in the polymerization step, although not subject to any particular limitation, is preferably from 20 to 100° C., and more preferably from 40 to 80° C. At a polymerization reaction temperature below 20° C., the polymerization reaction may take a long time. On the other hand, at a polymerization reaction temperature above 100° C., side reactions arise, which may lower the yield. The polymerization reaction time in the polymerization step varies depending on the reaction temperature and thus cannot be strictly specified, although in general is preferably from 2 to 40 hours.

Following completion of the polymerization reaction, the polymer may be isolated from the polymerization reaction mixture by a combination of unit operations such as filtration and drying.

The present invention is characterized by, subsequent to the polymerization step between carbon dioxide and an epoxide, carrying out a step involving treatment with a surfactant.

The aliphatic polycarbonate production method of the present invention includes the above polymerization step and the step of treating with a surfactant the polymer obtainable in the polymerization step.

Examples of methods for carrying out the step of treatment with a surfactant include methods in which a surfactant is added to the reaction mixture following the polymerization step, and methods in which a surfactant is added and mixed into the polymer obtained by filtration, drying and the like after the polymerization step.

The surfactant used may be an anionic surfactant, a cationic surfactant, a nonionic surfactant or an amphoteric surfactant.

Illustrative examples of suitable anionic surfactants include sodium salts of fatty acids, potassium salts of fatty acids, sodium alkyl sulfates, sodium alkylbenzenesulfonates, sodium alkanesulfonates, sodium alkyl phosphates, acyloyl methyl taurates, sodium N-methyl-N-acylamidopropionates, sodium monoalkylbiphenyl ether disulfonates, sodium naphthalene sulfonate-formalin condensates, sodium acylglutamates, ammonium dimethylsulfosuccinates, sodium dimethylsulfosuccinates, sodium polyoxyethylene alkyl ether sulfoxide, sodium polyoxyethylene alkyl ether methyl carboxylates and sodium polyoxyethylene alkyl ether ethanesulfonates.

Illustrative examples of suitable cationic surfactants include monoalkyltrimethylammonium methosulfates, cationized cellulose, alkyltrimethylammonium chloride, distearyldimethylammonium chloride, dialkyldimethylammonium chloride, dialkyldimethylbenzylammonium chloride and alkylpyridinium chloride.

Illustrative examples of suitable nonionic surfactants include fatty acid monoglycerides, partial esters of sorbitan fatty acids, polyoxyethylene alkyl ethers, polyoxyethylene alkyl phenyl ethers, polyoxyethylene fatty acid monoglycerides, partial esters of polyoxyethylene sorbitol fatty acids, partial esters of polyoxyethylene sorbitan fatty acids, polyoxyethylene lanolin alcohol ethers, polyethylene glycol fatty acid monoesters, polyethylene glycol fatty acid diesters, polyoxyethylene fatty amines, partial esters of polyglycerol fatty acids, bis(2-hydroxyethyl)alkyl amines, alkyldimethylamine oxides, fatty acid alkylolamides, ω-methoxypolyoxyethylene-α-alkyl ethers, polyoxyethylene polyoxypropylene block copolymers, polyoxyethylene polyoxypropylene alkyl ethers, polyoxyethylene acetylene glycol and partial esters of sugar-fatty acids.

Illustrative examples of suitable amphoteric surfactants include N-acylamidopropyl-N,N-dimethylammonium betaine, N-acylamidopropyl-N',N'-dimethyl-N'-β-hydroxypropylammonium sulfobetaine, N-acylamidoethyl-N'-hydroxyethyl-N'-carboxymethylammonium betaine, N-alkyl-N-dimethyl-N-carboxymethylammonium betaine, alkyldiaminoethyl glycine and acylated polypeptides.

Of these surfactants, from the standpoint of ease of industrial availability and low cost, and from the standpoint of efficiently reducing the amount of metal catalyst present in the resulting aliphatic polycarbonate, the use of an anionic surfactant is preferred. Of the anionic surfactants, preferred use may be made of ammonium lauryl sulfate, sodium lauryl sulfate, ammonium dodecylbenzenesulfonate, sodium dodecylbenzenesulfonate, ammonium dimethylsulfosuccinate and sodium dimethylsulfosuccinate. The use of ammonium lauryl sulfate or sodium lauryl sulfate is especially preferred. These surfactants may be used singly or as combinations of two or more thereof.

From the standpoint of reducing the amount of metal catalyst present in the resulting aliphatic polycarbonate, the amount of surfactant used per 100 parts by mass of the epoxide used in the polymerization step is preferably from 0.001 to 20 parts by mass, and more preferably from 0.01 to 10 parts by mass. When the amount of surfactant used is less than 0.001 parts by mass, a sufficient decrease in the amount of metal catalyst present in the resulting aliphatic polycarbonate may not be achieved. On the other hand, when the amount of surfactant exceeds 20 parts by mass, effects in accord with the amount of use may not be obtained, which may be economically undesirable.

In the step involving treatment with a surfactant, a solvent is preferably used in order to more efficiently obtain an aliphatic polycarbonate having a low content of metal catalyst.

The solvent is not subject to any particular limitation, provided it is a solvent which dissolves aliphatic polycarbonate. Illustrative examples include carbonate solvents such as dimethyl carbonate, diethyl carbonate and propylene carbonate; and halogenated hydrocarbon solvents such as chloromethane, methylene dichloride, chloroform, carbon tetrachloride, 1,1-dichloroethane, 1,2-dichloroethane, ethyl chloride, trichloroethane, 1-chloropropane, 2-chloropropane, 1-chlorobutane, 2-chlorobutane, 1-chloro-2-methylpropane, chlorobenzene and bromobenzene. Of these solvents, from the standpoint of the safety of the solvent used and because the solution of the aliphatic polycarbonate dissolved therein has a low viscosity, making handling in the step involving treatment with a surfactant easy, the use of a carbonate-type solvent such as dimethyl carbonate, diethyl carbonate or propylene carbonate is preferred. These solvents may be used singly or may be used in combinations of two or more thereof.

The solvent is used in an amount per 100 parts by mass of the epoxide used in the polymerization step of preferably from 200 to 10,000 parts by mass, and more preferably from 250 to 2,500 parts by mass.

The temperature of treatment with the surfactant, although not subject to any particular limitation, is preferably from 0 to 80° C., and more preferably from 10 to 50° C. The treatment time with the surfactant varies depending on the treatment temperature and thus cannot be strictly specified, although in general is preferably from 0.1 to 20 hours.

Following the step of treatment with the above surfactant, if necessary, stirring is carried out in order to bring the surfactant fully into contact with the polymer, after which the aliphatic polycarbonate may be obtained by leaving the system at rest and filtration, as well as by washing with a solvent or the like, if necessary, followed by drying.

Effect of the Invention

The present invention is thus able to provide an aliphatic polycarbonate production method which easily produces aliphatic polycarbonate having a low metal catalyst content using carbon dioxide and an epoxide.

The aliphatic polycarbonate production method of the invention is thus able to easily provide high-purity aliphatic polycarbonate having a low metal catalyst content.

MODE(S) FOR CARRYING OUT THE INVENTION

The invention is described below in greater detail by way of working examples and comparative examples, although the invention is not limited by these examples.

PRODUCTION EXAMPLE 1

Production of Organozinc Catalyst

A 300 mL 4-neck flask fitted with a stirrer, a nitrogen inlet, a thermometer and a reflux condenser was charged with 8.1 g (100 mmol) of zinc oxide, 12.7 g (96 mmol) of glutaric acid, 0.1 g (2 mmol) of acetic acid and 130 g (150 mL) of toluene. Next, the interior of the reaction system was blanketed with a nitrogen atmosphere, following which the temperature was raised to 55° C. and reaction was effected by 4 hours of stirring at the same temperature. The temperature was then raised to 110° C., and azeotropic dewatering was carried out by 4 hours of stirring at the same temperature, thereby removing only water. The system was then cooled down to room temperature, giving a reaction mixture containing an organozinc catalyst.

The organozinc catalyst obtained by collecting a portion of this reaction mixture and filtration was subjected to infrared measurement (apparatus available from Thermo Nicolet Japan, Inc. under the trade name AVATAR 360). No peaks based on carboxylic groups were observed.

EXAMPLE 1

The interior of a 1 L autoclave fitted with a stirrer, a gas inlet and a thermometer was blanketed beforehand with a nitrogen atmosphere, then charged with 8.0 mL of the organozinc catalyst-containing reaction mixture (containing 1.0 g of organozinc catalyst) obtained in Production Example 1, 131 g (200 mL) of hexane and 35.2 g (0.80 mol) of ethylene oxide. Next, under stirring, carbon dioxide was added, the interior of the reaction system was blanketed with a carbon dioxide atmosphere, and the autoclave was filled with carbon dioxide until the interior of the reaction system reached a pressure of 1.5 MPa. The temperature was then raised to 60° C., and the polymerization reaction was carried out for 6 hours while replenishing the carbon dioxide consumed by the reaction. Following reaction completion, the autoclave was cooled, the pressure was released, and the contents were filtered, following which vacuum drying was carried out, giving 68.4 g of polymer.

Next, 50 g of the resulting polymer (stoichiometric amount of ethylene oxide used for obtaining 50 g of the polymer: 24.6 g) and 250 g of dimethyl carbonate were charged into a 500 mL 4-neck flask equipped with a stirrer and a thermometer, then 0.25 g of ammonium lauryl sulfate was added under stirring at 25° C. and stirring was continued at the same temperature for 1 hour, following which the system was left at rest for 10 hours. After being left at rest, the flask contents were filtered and the dimethyl carbonate was distilled off, following which vacuum drying was carried out, giving 48.7 g of polyethylene carbonate.

The resulting polyethylene carbonate was identified from the following properties.

IR (KBr): 1740, 1447, 1386, 1217, 1029, 785 (cm$^{-1}$)

The zinc content included in the resulting polyethylene carbonate, as measured by the ICP-AES method (apparatus available from Thermo Fischer Scientific, Inc. under the trade name IRIS advantage), was 3.5 ppm.

EXAMPLE 2

Aside from changing the amount of ammonium lauryl sulfate used from 0.25 to 1.0 g, 48.2 g of polyethylene carbonate was obtained in the same way as in Example 1.

The zinc content included in the resulting polyethylene carbonate, as measured by the ICP-AES method (apparatus available from Thermo Fischer Scientific, Inc. under the trade name IRIS advantage), was 0.5 ppm.

EXAMPLE 3

Aside from changing the amount of ammonium lauryl sulfate used from 0.25 to 0.01 g, 48.3 g of polyethylene carbonate was obtained in the same way as in Example 1.

The zinc content included in the resulting polyethylene carbonate, as measured by the ICP-AES method (apparatus available from Thermo Fischer Scientific, Inc. under the trade name IRIS advantage), was 9.0 ppm.

EXAMPLE 4

Aside from changing the 0.25 g of ammonium lauryl sulfate used from 0.25 to 4.0 g, 47.6 g of polyethylene carbonate was obtained in the same way as in Example 1.

The zinc content included in the resulting polyethylene carbonate, as measured by the ICP-AES method (apparatus available from Thermo Fischer Scientific, Inc. under the trade name IRIS advantage), was 0.2 ppm.

EXAMPLE 5

Aside from changing the 0.25 g of ammonium lauryl sulfate used in Example 1 to 0.25 g of sodium lauryl sulfate, 47.9 g of polyethylene carbonate was obtained in the same way as in Example 1.

The zinc content included in the resulting polyethylene carbonate, as measured by the ICP-AES method (apparatus available from Thermo Fischer Scientific, Inc. under the trade name IRIS advantage), was 3.7 ppm.

EXAMPLE 6

Aside from using 46.4 g (0.80 mol) of propylene oxide instead of the 35.2 g (0.80 mol) of ethylene oxide used in Example 1, 80.8 g of polymer was obtained in the same way as in Example 1.

Next, using 50 g of the resulting polymer (stoichiometric amount of propylene oxide used for obtaining 50 g of the polymer, 28.1 g), 47.5 g of polypropylene carbonate was obtained in the same way as in Example 1.

The resulting polyethylene carbonate was identified from the following properties.

IR (KBr): 1742, 1456, 1381, 1229, 1069, 787 (cm$^{-1}$)

The zinc content included in the resulting polyethylene carbonate, as measured by the ICP-AES method (apparatus available from Thermo Fischer Scientific, Inc. under the trade name IRIS advantage), was 4.2 ppm.

EXAMPLE 7

The interior of a 1 L autoclave fitted with a stirrer, a gas inlet and a thermometer was blanketed beforehand with a nitrogen atmosphere, then charged with 8.0 mL of the organozinc catalyst-containing reaction mixture (containing 1.0 g of organozinc catalyst) obtained in Production Example 1, 241 g (200 mL) of propylene carbonate and 35.2 g (0.80 mol) of ethylene oxide. Next, under stirring, carbon dioxide was added, the interior of the reaction system was blanketed with a carbon dioxide atmosphere, and the autoclave was filled with carbon dioxide until the interior of the reaction system reached a pressure of 1.5 MPa. The temperature was then raised to 60° C., and the polymerization reaction was carried out for 6 hours while replenishing the carbon dioxide consumed by the reaction. Following reaction completion, the autoclave was cooled and the pressure was released, giving 312 g of a polymer-containing slurry.

Next, 250 g of the resulting polymer-containing slurry (stoichiometric amount of ethylene oxide used for obtaining 250 g of the slurry: 28.2 g) was charged into a 500 mL 4-neck flask equipped with a stirrer and a thermometer, then 0.25 g of ammonium lauryl sulfate was added under stirring at 25° C. and stirring was continued at the same temperature for 1 hour, following which the system was left at rest for 10 hours. After being left at rest, the flask contents were filtered and the propylene carbonate was distilled off, following which vacuum drying was carried out, giving 58.7 g of polyethylene carbonate.

The resulting polyethylene carbonate was identified from the following properties.

IR (KBr): 1741, 1447, 1386, 1218, 1029, 785 (cm$^{-1}$)

The zinc content included in the resulting polyethylene carbonate, as measured by the ICP-AES method (apparatus available from Thermo Fischer Scientific, Inc. under the trade name IRIS advantage), was 3.2 ppm.

COMPARATIVE EXAMPLE 1

Aside from not using the 0.25 g of ammonium lauryl sulfate used in Example 1, 47.8 g of polyethylene carbonate was obtained in the same way as in Example 1.

The zinc content included in the resulting polyethylene carbonate, as measured by the ICP-AES method (apparatus available from Thermo Fischer Scientific, Inc. under the trade name IRIS advantage), was 13,700 ppm.

TABLE 1

| | | Surfactant | | |
| --- | --- | --- | --- | --- |
| | Epoxide | Type | Amount used (g) | Zinc content (ppm) |
| Example 1 | Ethylene oxide | Ammonium lauryl sulfate | 0.25 | 3.5 |
| Example 2 | Ethylene oxide | Ammonium lauryl sulfate | 1.0 | 0.5 |
| Example 3 | Ethylene oxide | Ammonium lauryl sulfate | 0.01 | 9.0 |
| Example 4 | Ethylene oxide | Ammonium lauryl sulfate | 4.0 | 0.2 |
| Example 5 | Ethylene oxide | Sodium lauryl sulfate | 0.25 | 3.7 |
| Example 6 | Propylene oxide | Ammonium lauryl sulfate | 0.25 | 4.2 |
| Example 7 | Ethylene oxide | Ammonium lauryl sulfate | 0.25 | 3.2 |
| Comparative Example 1 | Ethylene oxide | — | — | 13700 |

Industrial Applicability

The present invention is able to provide an aliphatic polycarbonate production method which, using carbon dioxide and an epoxide, easily produces aliphatic polycarbonate having a low metal catalyst content.

The invention claimed is:

1. A method for producing an aliphatic polycarbonate, which comprising:
    a step of polymerization by reacting carbon dioxide with an epoxide in the presence of a metal catalyst; and
    a step of treating a polymer obtained in the polymerization step with a surfactant.

2. The method for producing an aliphatic polycarbonate according to claim 1,
    wherein the metal catalyst is an organozinc catalyst.

3. The method for producing an aliphatic polycarbonate according to claim 2,
    wherein the organozinc catalyst is an organozinc catalyst obtained by reacting a zinc compound with an aliphatic dicarboxylic acid and an aliphatic monocarboxylic acid.

4. The method for producing an aliphatic polycarbonate according to claim 3,
    wherein the aliphatic monocarboxylic acid is used in an amount ratio from 0.0001 to 0.1 mole per mole relative to the aliphatic dicarboxylic acid.

5. The method for producing an aliphatic polycarbonate according to claim 1,
    wherein the surfactant is an anionic surfactant.

6. The method for producing an aliphatic polycarbonate according to claim 5,
    wherein the anionic surfactant is one or more compounds selected from the group consisting of ammonium lauryl sulfate, sodium lauryl sulfate, ammonium dodecylbenzenesulfonate, sodium dodecylbenzenesulfonate, ammonium dimethylsulfosuccinate and sodium dimethylsulfosuccinate.

7. The method for producing an aliphatic polycarbonate according to claim 1,
   wherein an amount of surfactant is from 0.001 to 20 parts by mass relative to 100 parts by mass of the epoxide.

* * * * *